(12) United States Patent
Botma

(10) Patent No.: US 7,715,101 B2
(45) Date of Patent: May 11, 2010

(54) ELECTROMAGNETIC RADIATION PULSE DURATION CONTROL APPARATUS AND METHOD

(75) Inventor: Hako Botma, Eindhoven (NL)

(73) Assignee: ASML Netherlands B.V., Veldhoven (NL)

( * ) Notice: Subject to any disclaimer, the term of this patent is extended or adjusted under 35 U.S.C. 154(b) by 189 days.

(21) Appl. No.: 11/860,309

(22) Filed: Sep. 24, 2007

(65) Prior Publication Data

US 2009/0080085 A1 Mar. 26, 2009

(51) Int. Cl.
  *G02B 27/10* (2006.01)
  *G02B 27/14* (2006.01)
(52) U.S. Cl. .................. 359/618; 359/629; 372/5; 372/25; 372/57; 250/458.1; 342/375
(58) Field of Classification Search .......... 359/238, 359/239, 245, 250, 255, 256, 315, 618, 629, 359/833, 837; 372/5, 16, 25, 57, 72, 93, 372/100, 101, 105, 108, 700; 342/158, 375; 250/225, 227.12, 237 R, 458.1, 492.1, 550, 250/552; 356/498
See application file for complete search history.

(56) References Cited

U.S. PATENT DOCUMENTS

| | | | | |
|---|---|---|---|---|
| 3,391,283 A * | 7/1968 | Kuhne | .............. | 356/498 |
| 3,514,709 A * | 5/1970 | Louis | .............. | 359/349 |
| 5,117,239 A * | 5/1992 | Riza | .............. | 342/375 |
| 5,309,456 A * | 5/1994 | Horton | .............. | 372/25 |
| 5,475,525 A * | 12/1995 | Tournois et al. | .............. | 359/245 |
| 7,394,077 B2 * | 7/2008 | Baer | .............. | 250/458.1 |
| 7,630,424 B2 * | 12/2009 | Ershov et al. | .............. | 372/57 |
| 2008/0267242 A1 * | 10/2008 | Ershov et al. | .............. | 372/57 |

* cited by examiner

*Primary Examiner*—Loha Ben
(74) *Attorney, Agent, or Firm*—Sterne, Kessler, Goldstein & Fox P.L.L.C.

(57) ABSTRACT

Apparatus and methods are used for controlling electromagnetic radiation pulse duration in a lithographic apparatus. A dividing element is arranged to divide an electromagnetic radiation pulse into a first portion and a second portion. A prism receives, refracts, and subsequently emits the first portion of the electromagnetic radiation pulse. A directing element is arranged to direct the first and second portions of the electromagnetic radiation pulse parallel to a common optical axis. The first portion combines with the second portion to form a combined radiation beam pulse. The combined radiation beam pulse has a longer pulse duration than the divided electromagnetic pulse and experiences no corresponding loss in intensity.

17 Claims, 9 Drawing Sheets

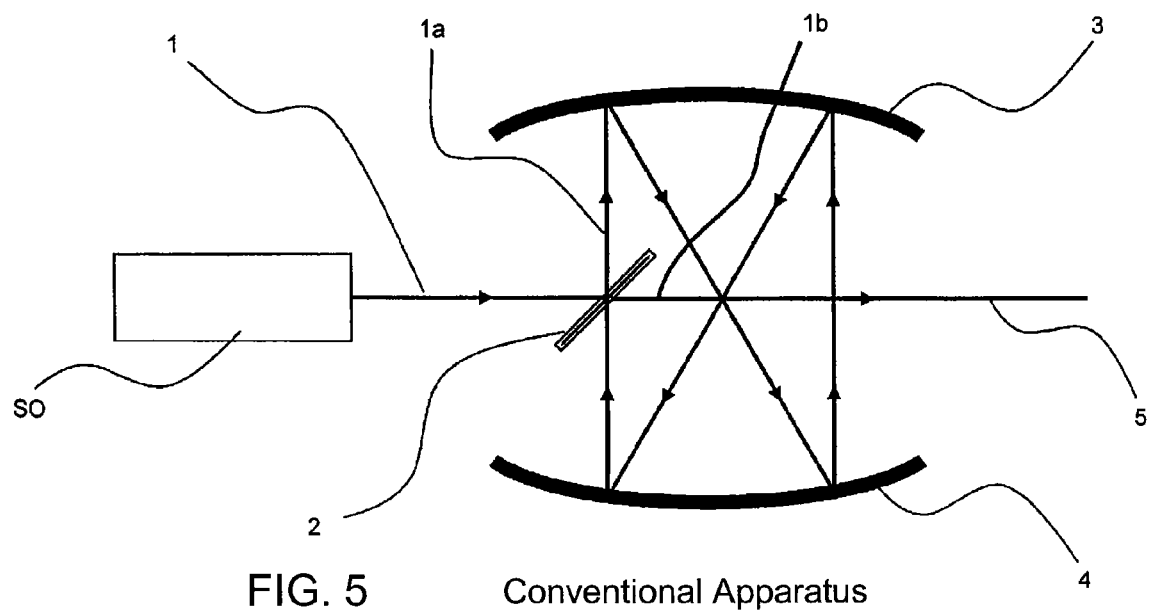
FIG. 5   Conventional Apparatus
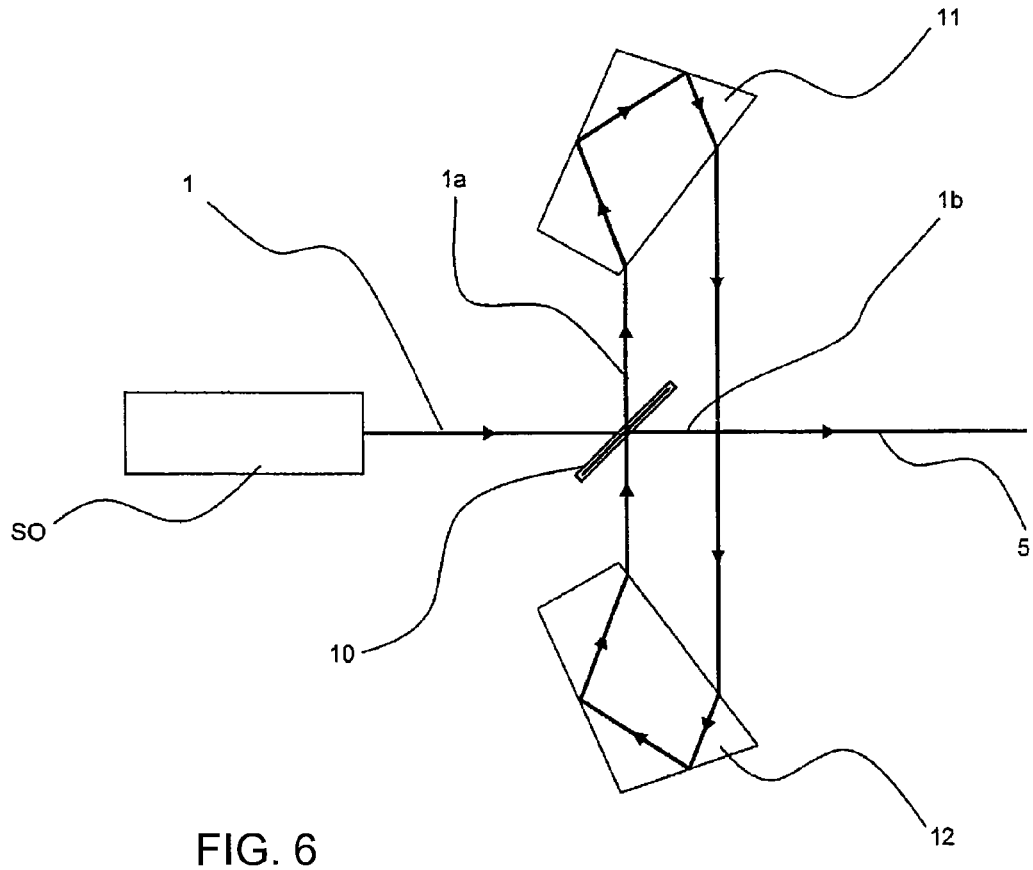
FIG. 6

ELECTROMAGNETIC RADIATION PULSE DURATION CONTROL APPARATUS AND METHOD

BACKGROUND

1. Field of the Invention

The present invention relates to an apparatus and a method for controlling electromagnetic radiation pulse duration.

2. Related Art

A lithographic apparatus is a machine that applies a desired pattern onto a substrate or part of a substrate. A lithographic apparatus can be used, for example, in the manufacture of flat panel displays, integrated circuits (ICs) and other devices involving fine structures. In a conventional apparatus, a patterning device, which can be referred to as a mask or a reticle, can be used to generate a circuit pattern corresponding to an individual layer of a flat panel display (or other device) or an IC. This pattern can be imaged onto a target portion (e.g., comprising part of one or several dies) on a substrate (e.g., a silicon wafer) that has a layer of radiation-sensitive material (e.g., resist) using a beam of radiation. In general, a single substrate will contain a network of adjacent target portions that are successively exposed. Conventional lithographic apparatus include so-called steppers, in which each target portion is irradiated by exposing an entire pattern onto the target portion, and so-called scanners, in which each target portion is irradiated by scanning the pattern through the beam in a given direction (the "scanning"-direction) while synchronously scanning the substrate parallel or anti parallel to this direction.

Instead of a circuit pattern, the patterning device can be used to generate other patterns, for example a color filter pattern or a matrix of dots. Instead of a mask, the patterning device can be a patterning array that comprises an array of individually controllable elements. The pattern can be changed more quickly and for less cost in such a system compared to a mask-based system.

A flat panel display substrate is typically rectangular in shape. Lithographic apparatus designed to expose a substrate of this type can provide an exposure region that covers a full width of the rectangular substrate, or covers a portion of the width (for example half of the width). The substrate can be scanned underneath the exposure region, while the mask or reticle is synchronously scanned through a beam. In this way, the pattern is transferred to the substrate. If the exposure region covers the full width of the substrate then exposure can be completed with a single scan. If the exposure region covers, for example, half of the width of the substrate, then the substrate can be moved transversely after the first scan, and a further scan is typically performed to expose the remainder of the substrate.

In conventional lithographic apparatus, the beam of radiation may be provided by a radiation source (e.g., a laser or an arc lamp), and the radiation beam may be formed by or comprised of a plurality of radiation beam pulses. The radiation beam pulses may be generated by pulsing the radiation source or by selectively allowing or preventing the passage of a continuous beam of radiation. A certain exposure energy is associated with each of the radiation beam pulses, and the energy of a respective pulse may be calculated as the intensity of the radiation beam pulse integrated over the duration of the pulse. Thus, the energy of the radiation beam pulse may be increased by increasing the pulse duration and/or by increasing the intensity. Alternatively, the energy of the radiation beam pulse may be kept constant by varying the intensity by a certain amount and by varying the pulse duration by corresponding amount.

The beam of radiation may pass through lenses, gratings, masks, etc., or be reflected from mirrors or other reflective surfaces. The intensity of radiation beam pulses forming the radiation beam may be high enough to temporarily or permanently damage those surfaces that contact the radiation beam. The intensity of a given pulse may be sufficient to instantly damage the surfaces, or the cumulative effects of a plurality (e.g., millions or billions) of pulses may be sufficient to cause such damage. In some circumstances, such damage may be tolerable. However, in general, it is desirable to avoid damage to optical elements through which the radiation beam passes through or off which the radiation beam reflects.

Reduction or elimination of such damage increases the lifetime of the elements and also ensures that the performance of the elements does not degrade rapidly. One approach to reducing such damage is to reduce the intensity of the radiation beam pulses that form the radiation beam. However, if the intensity of the radiation beam pulses is decreased without a corresponding change in pulse duration, the total energy of a given radiation beam pulse will decrease. The decrease in total energy may not be desirable, as a radiation beam pulse may require a certain threshold energy in order to perform a certain function, such as applying a pattern to a photosensitive material. Therefore, in addition to reducing the intensity of the radiation beam pulses to reduce or eliminate damage to surfaces through which the radiation beam passes or off which the radiation beam reflects, it is also desirable to increase the duration (i.e., the length) of the radiation beam pulse to ensure that the total energy of the pulse remains unchanged and at or above the threshold value.

Conventional apparatus increase the duration of a radiation beam pulse by reflecting a portion of the radiation beam around a reflective optical circuit provided by mirrors. The reflected portion is then directed in the direction of travel of the non-reflected portion of the radiation beam. By carefully controlling parameters associated with the reflection of the portion of the radiation beam pulse, the reflected radiation beam pulse can be made to slightly lag and/or overlap with the non-reflected portion of the radiation beam pulse. The lag and/or overlap in the radiation beam pulses is such that the two radiation beam pulses, in combination, effectively serve as a single radiation beam pulse having an increased length (e.g., an increased duration).

These conventional apparatus succeed in reducing the intensity of a radiation beam pulse, while effectively increasing the length of the pulse. However, these conventional apparatus have at least one disadvantage. By reflecting the portion of a radiation beam pulse around an optical circuit using mirrors, losses associated with each respective reflection decrease the intensity of the reflected portion. As losses in intensity increase, it becomes more difficult to ensure that a radiation beam pulse with sufficient intensity is incident upon a target portion of the resist coated substrate at a later stage in the lithographic apparatus.

Therefore, what is needed is an apparatus and method that allows the pulse duration of a radiation beam to be extended without a corresponding loss in intensity.

SUMMARY

In one embodiment, there is provided an electromagnetic radiation pulse duration control apparatus comprising a dividing element arranged to divide an electromagnetic radiation pulse into two portions comprising a first portion and a second portion. The apparatus includes a prism arranged to receive, refract and then emit the first portion of the electromagnetic radiation pulse. The apparatus also includes at least one directing element arranged to direct the first and second portions of the electromagnetic radiation pulse parallel to a common optical axis. In various examples, the dividing element and the directing element comprise a beam splitter, a semi-transparent mirror, a mirror, or a mirror block.

In one example, the prism is shaped and/or oriented such that the first portion of the electromagnetic radiation pulse is arranged to be incident upon the prism at substantially Brewster's angle. Further, in a second example, the prism is shaped and/or oriented such that the first portion of the electromagnetic radiation pulse is arranged to be substantially totally internally reflected by at least one surface of the prism. In a third example, the prism is shaped and/or oriented such that at the location at which the first portion of the electromagnetic radiation pulse leaves the prism, the first portion of the electromagnetic radiation pulse is arranged to be incident upon a surface of the prism at substantially Brewster's angle.

In another embodiment, there is provided a method of controlling a duration of an electromagnetic radiation pulse that divides the electromagnetic radiation pulse into a first portion and a second portion. The method also uses a prism to receive, refract and then emit the first portion of the electromagnetic radiation pulse. Further, the method directs the first and second portions of the electromagnetic radiation pulse parallel to a common optical axis.

Further embodiments, features, and advantages of the present inventions, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate one or more embodiments of the present invention and, together with the description, further serve to explain the principles of the invention and to enable a person skilled in the pertinent art to make and use the invention.

FIG. 5 depicts a conventional apparatus for increasing the duration of a radiation beam pulse in a lithographic apparatus.

FIG. 6 depicts an exemplary apparatus for increasing the duration of a radiation beam pulse.

Figure 9:
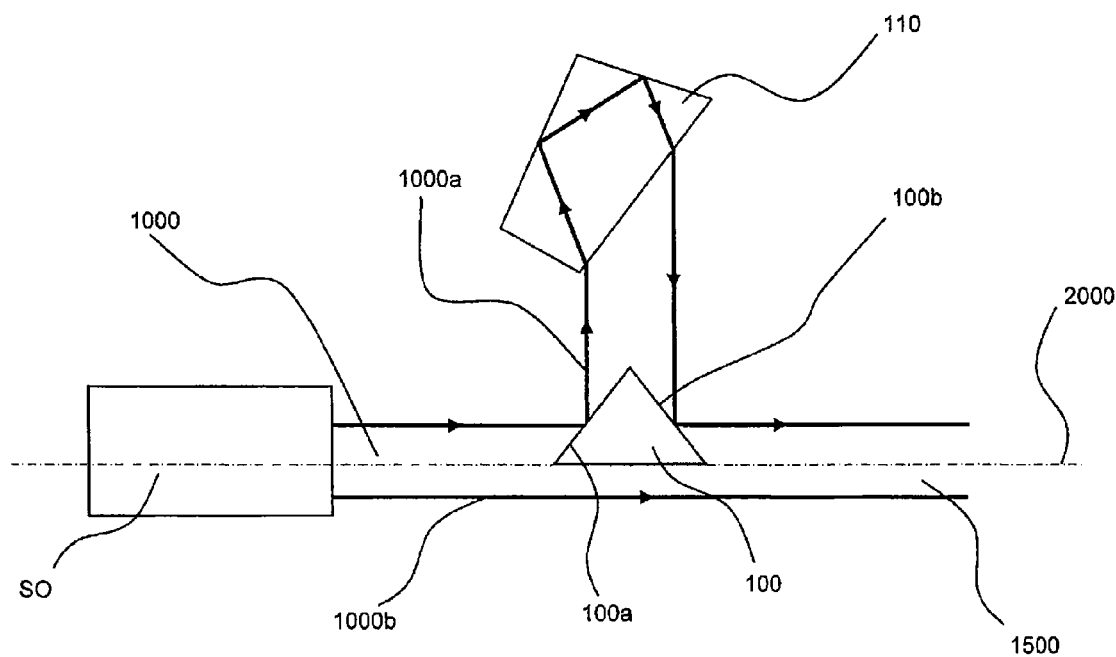
Figure 10:
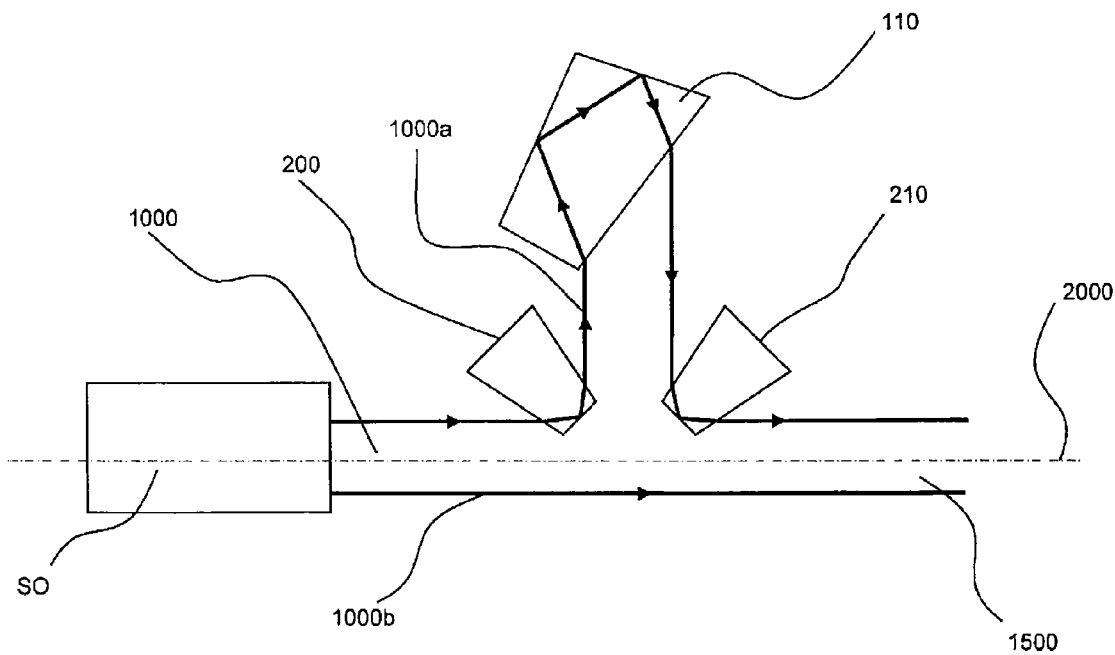
Figure 11:
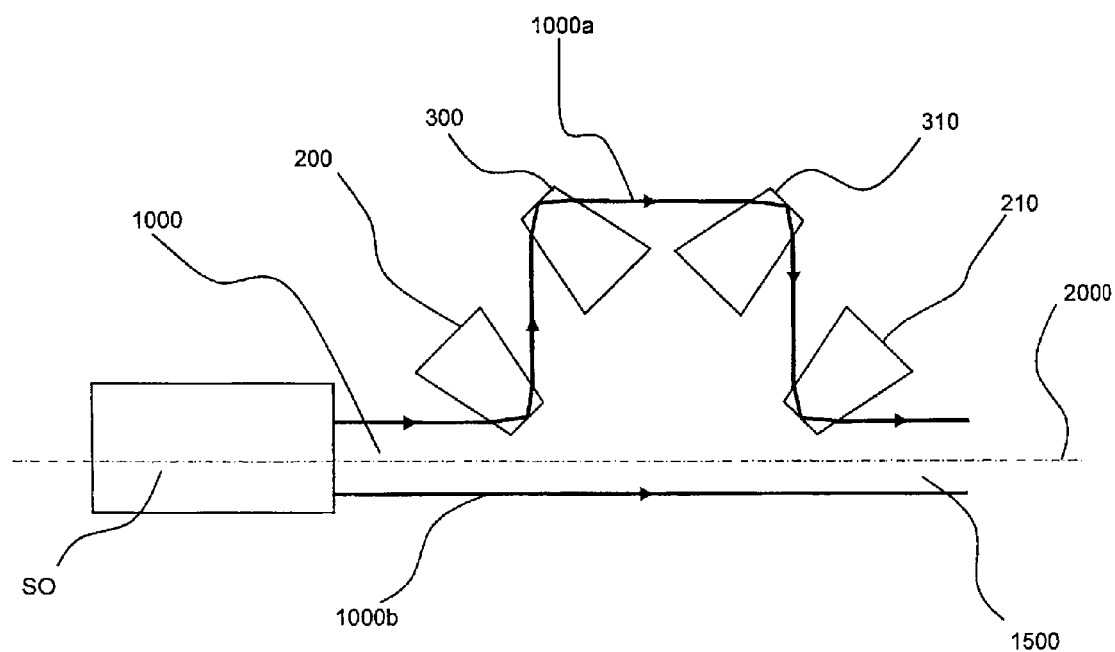

FIGS. 9, 10, and 11 depict exemplary apparatus for increasing the duration of a radiation beam pulse.

One or more embodiments of the present invention will now be described with reference to the accompanying drawings. In the drawings, like reference numbers can indicate identical or functionally similar elements.

DETAILED DESCRIPTION

This specification discloses one or more embodiments that incorporate the features of this invention. The disclosed embodiment(s) merely exemplify the invention. The scope of the invention is not limited to the disclosed embodiment(s). The invention is defined by the claims appended hereto.

The embodiment(s) described, and references in the specification to "one embodiment", "an embodiment", "an example embodiment", etc., indicate that the embodiment(s) described can include a particular feature, structure, or characteristic, but every embodiment cannot necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Embodiments of the invention can be implemented in hardware, firmware, software, or any combination thereof. Embodiments of the invention can also be implemented as instructions stored on a machine-readable medium, which can be read and executed by one or more processors. A machine-readable medium can include any mechanism for storing or transmitting information in a form readable by a machine (e.g., a computing device). For example, a machine-readable medium can include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions can be described herein as performing certain actions. However, it should be appreciated that such descriptions are merely for convenience and that such actions in fact result from computing devices, processors, controllers, or other devices executing the firmware, software, routines, instructions, etc.

Figure 1:
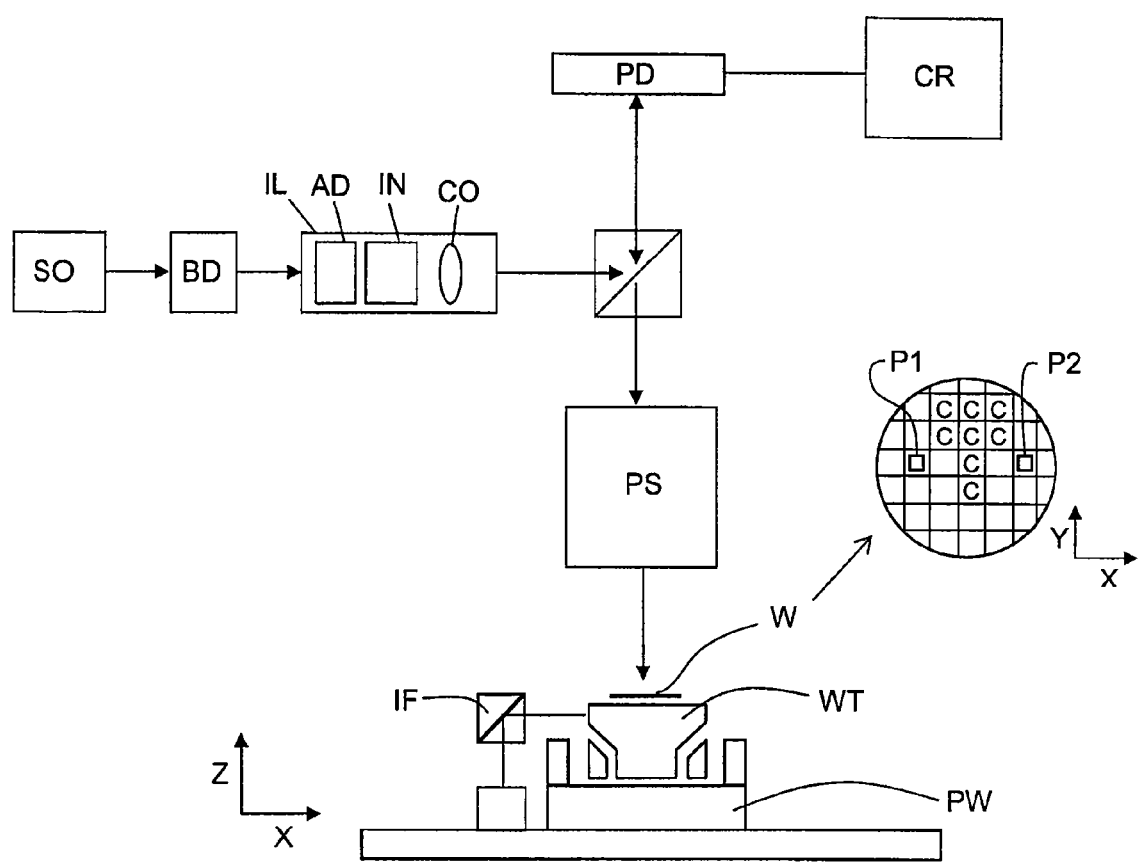
FIGS. 1 and 2 depict lithographic apparatus.

FIG. 1 schematically depicts the lithographic apparatus 1 of one embodiment of the invention. The apparatus comprises an illumination system IL, a patterning device PD, a substrate table WT, and a projection system PS. The illumination system (illuminator) IL is configured to condition a radiation beam B (e.g., UV radiation).

It is to be appreciated that, although the description is directed to lithography, the patterned device PD can be formed in a display system (e.g., in a LCD television or projector), without departing from the scope of the present invention. Thus, the projected patterned beam can be projected onto many different types of objects, e.g., substrates, display devices, etc.

The substrate table WT is constructed to support a substrate (e.g., a resist-coated substrate) W and connected to a positioner PW configured to accurately position the substrate in accordance with certain parameters.

The projection system (e.g., a refractive projection lens system) PS is configured to project the beam of radiation modulated by the array of individually controllable elements onto a target portion C (e.g., comprising one or more dies) of the substrate W. The term "projection system" used herein should be broadly interpreted as encompassing any type of projection system, including refractive, reflective, catadioptric, magnetic, electromagnetic and electrostatic optical systems, or any combination thereof, as appropriate for the exposure radiation being used, or for other factors such as the use of an immersion liquid or the use of a vacuum. Any use of the term "projection lens" herein can be considered as synonymous with the more general term "projection system."

The illumination system can include various types of optical components, such as refractive, reflective, magnetic, electromagnetic, electrostatic or other types of optical components, or any combination thereof, for directing, shaping, or controlling radiation.

The patterning device PD (e.g., a reticle or mask or an array of individually controllable elements) modulates the beam. In general, the position of the array of individually controllable elements will be fixed relative to the projection system PS. However, it can instead be connected to a positioner configured to accurately position the array of individually controllable elements in accordance with certain parameters.

The term "patterning device" or "contrast device" used herein should be broadly interpreted as referring to any device that can be used to modulate the cross-section of a radiation beam, such as to create a pattern in a target portion of the substrate. The devices can be either static patterning devices (e.g., masks or reticles) or dynamic (e.g., arrays of programmable elements) patterning devices. For brevity, most of the description will be in terms of a dynamic patterning device, however it is to be appreciated that a static pattern device can also be used without departing from the scope of the present invention.

It should be noted that the pattern imparted to the radiation beam cannot exactly correspond to the desired pattern in the target portion of the substrate, for example if the pattern includes phase-shifting features or so called assist features. Similarly, the pattern eventually generated on the substrate cannot correspond to the pattern formed at any one instant on the array of individually controllable elements. This can be the case in an arrangement in which the eventual pattern formed on each part of the substrate is built up over a given period of time or a given number of exposures during which the pattern on the array of individually controllable elements and/or the relative position of the substrate changes.

Generally, the pattern created on the target portion of the substrate will correspond to a particular functional layer in a device being created in the target portion, such as an integrated circuit or a flat panel display (e.g., a color filter layer in a flat panel display or a thin film transistor layer in a flat panel display). Examples of such patterning devices include reticles, programmable mirror arrays, laser diode arrays, light emitting diode arrays, grating light valves, and LCD arrays.

Patterning devices whose pattern is programmable with the aid of electronic means (e.g., a computer), such as patterning devices comprising a plurality of programmable elements (e.g., all the devices mentioned in the previous sentence except for the reticle), are collectively referred to herein as "contrast devices." The patterning device comprises at least 10, at least 100, at least 1,000, at least 10,000, at least 100,000, at least 1,000,000, or at least 10,000,000 programmable elements.

A programmable mirror array can comprise a matrix-addressable surface having a viscoelastic control layer and a reflective surface. The basic principle behind such an apparatus is that addressed areas of the reflective surface reflect incident light as diffracted light, whereas unaddressed areas reflect incident light as undiffracted light. Using an appropriate spatial filter, the undiffracted light can be filtered out of the reflected beam, leaving only the diffracted light to reach the substrate. In this manner, the beam becomes patterned according to the addressing pattern of the matrix-addressable surface.

It will be appreciated that, as an alternative, the filter can filter out the diffracted light, leaving the undiffracted light to reach the substrate.

An array of diffractive optical MEMS devices (micro-electro-mechanical system devices) can also be used in a corresponding manner. In one example, a diffractive optical MEMS device is composed of a plurality of reflective ribbons that can be deformed relative to one another to form a grating that reflects incident light as diffracted light.

A further alternative example of a programmable mirror array employs a matrix arrangement of tiny mirrors, each of which can be individually tilted about an axis by applying a suitable localized electric field, or by employing piezoelectric actuation means. Once again, the mirrors are matrix-addressable, such that addressed mirrors reflect an incoming radiation beam in a different direction than unaddressed mirrors; in this manner, the reflected beam can be patterned according to the addressing pattern of the matrix-addressable mirrors. The required matrix addressing can be performed using suitable electronic means.

Another example PD is a programmable LCD array.

The lithographic apparatus can comprise one or more contrast devices. For example, it can have a plurality of arrays of individually controllable elements, each controlled independently of each other. In such an arrangement, some or all of the arrays of individually controllable elements can have at least one of a common illumination system (or part of an illumination system), a common support structure for the arrays of individually controllable elements, and/or a common projection system (or part of the projection system).

In one example, such as the embodiment depicted in FIG. 1, the substrate W has a substantially circular shape, optionally with a notch and/or a flattened edge along part of its perimeter. In another example, the substrate has a polygonal shape, e.g., a rectangular shape.

Examples where the substrate has a substantially circular shape include examples where the substrate has a diameter of at least 25 mm, at least 50 mm, at least 75 mm, at least 100 mm, at least 125 mm, at least 150 mm, at least 175 mm, at least 200 mm, at least 250 mm, or at least 300 mm. Alternatively, the substrate has a diameter of at most 500 mm, at most 400 mm, at most 350 mm, at most 300 mm, at most 250 mm, at most 200 mm, at most 150 mm, at most 100 mm, or at most 75 mm.

Examples where the substrate is polygonal, e.g., rectangular, include examples where at least one side, at least 2 sides or at least 3 sides, of the substrate has a length of at least 5 cm, at least 25 cm, at least 50 cm, at least 100 cm, at least 150 cm, at least 200 cm, or at least 250 cm.

At least one side of the substrate has a length of at most 1000 cm, at most 750 cm, at most 500 cm, at most 350 cm, at most 250 cm, at most 150 cm, or at most 75 cm.

In one example, the substrate W is a wafer, for instance a semiconductor wafer. The wafer material can be selected from the group consisting of Si, SiGe, SiGeC, SiC, Ge, GaAs, InP, and InAs. The wafer can be: a III/V compound semiconductor wafer, a silicon wafer, a ceramic substrate, a glass substrate, or a plastic substrate. The substrate can be transparent (for the naked human eye), colored, or absent a color.

The thickness of the substrate can vary and, to an extent, can depend on the substrate material and/or the substrate dimensions. The thickness can be at least 50 μm, at least 100 μm, at least 200 μm, at least 300 μm, at least 400 μm, at least 500 μm, or at least 600 μm. Alternatively, the thickness of the substrate can be at most 5000 μm, at most 3500 μm, at most 2500 μm, at most 1750 μm, at most 1250 μm, at most 1000 μm, at most 800 μm, at most 600 μm, at most 500 μm, at most 400 μm, or at most 300 μm.

The substrate referred to herein can be processed, before or after exposure, in for example a track (a tool that typically applies a layer of resist to a substrate and develops the exposed resist), a metrology tool, and/or an inspection tool. In one example, a resist layer is provided on the substrate.

The projection system can image the pattern on the array of individually controllable elements, such that the pattern is coherently formed on the substrate. Alternatively, the projection system can image secondary sources for which the elements of the array of individually controllable elements act as shutters. In this respect, the projection system can comprise an array of focusing elements such as a micro lens array (known as an MLA) or a Fresnel lens array to form the secondary sources and to image spots onto the substrate. The array of focusing elements (e.g., MLA) comprises at least 10 focus elements, at least 100 focus elements, at least 1,000 focus elements, at least 10,000 focus elements, at least 100,000 focus elements, or at least 1,000,000 focus elements.

The number of individually controllable elements in the patterning device is equal to or greater than the number of focusing elements in the array of focusing elements. One or more (e.g., 1,000 or more, the majority, or each) of the focusing elements in the array of focusing elements can be optically associated with one or more of the individually controllable elements in the array of individually controllable elements, with 2 or more, 3 or more, 5 or more, 10 or more, 20 or more, 25 or more, 35 or more, or 50 or more of the individually controllable elements in the array of individually controllable elements.

The MLA can be movable (e.g., with the use of one or more actuators) at least in the direction to and away from the substrate. Being able to move the MLA to and away from the substrate allows, e.g., for focus adjustment without having to move the substrate.

Figure 2:
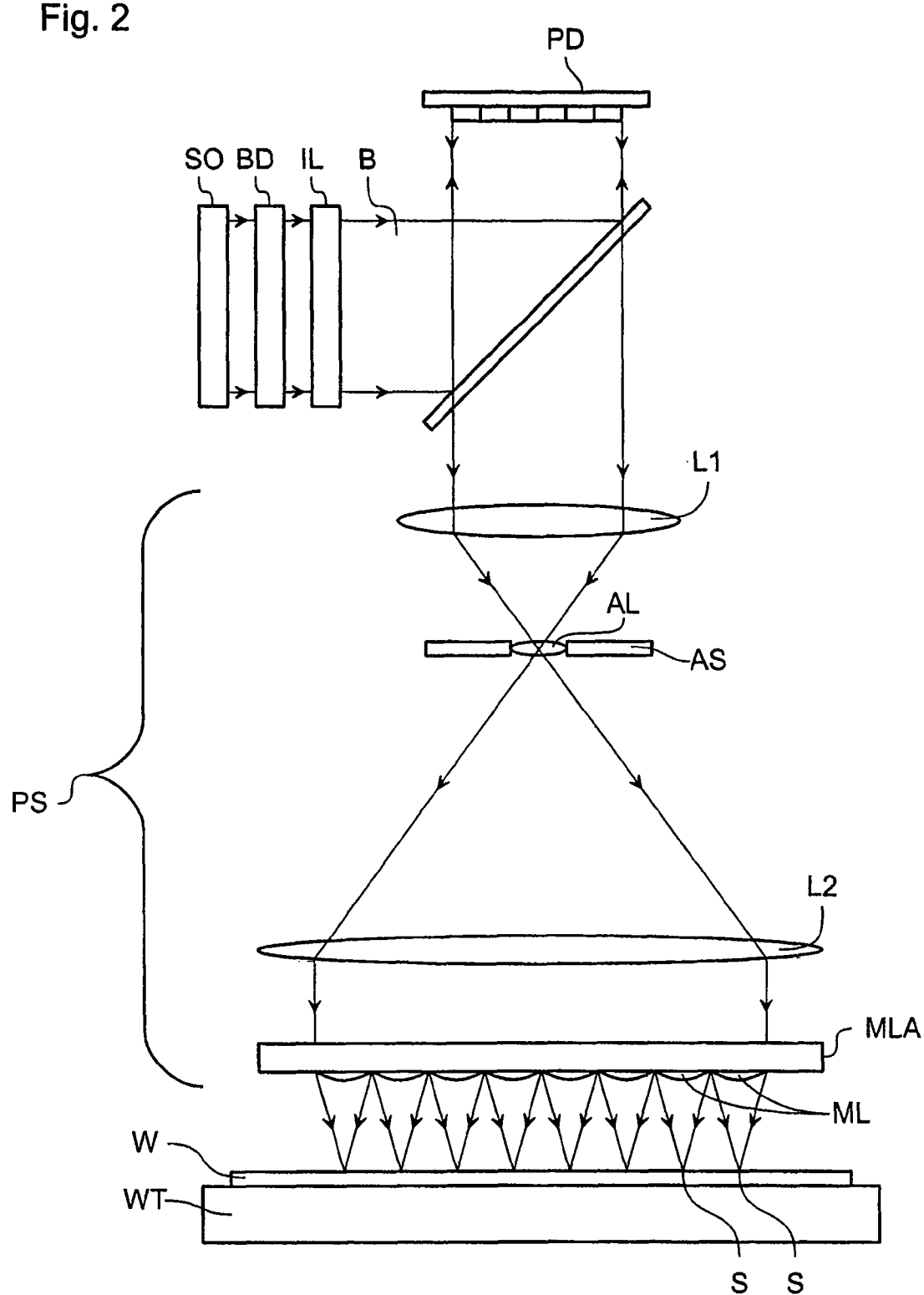

As herein depicted in FIGS. 1 and 2, the apparatus is of a reflective type (e.g., employing a reflective array of individually controllable elements). Alternatively, the apparatus can be of a transmission type (e.g., employing a transmission array of individually controllable elements).

The lithographic apparatus can be of a type having two (dual stage) or more substrate tables. In such "multiple stage" machines, the additional tables can be used in parallel, or preparatory steps can be carried out on one or more tables while one or more other tables are being used for exposure.

The lithographic apparatus can also be of a type wherein at least a portion of the substrate can be covered by an "immersion liquid" having a relatively high refractive index, e.g., water, so as to fill a space between the projection system and the substrate. An immersion liquid can also be applied to other spaces in the lithographic apparatus, for example, between the patterning device and the projection system. Immersion techniques are well known in the art for increasing the numerical aperture of projection systems. The term "immersion" as used herein does not mean that a structure, such as a substrate, must be submerged in liquid, but rather only means that liquid is located between the projection system and the substrate during exposure.

Referring again to FIG. 1, the illuminator IL receives a radiation beam from a radiation source SO. The radiation source provides radiation having a wavelength of at least 5 nm, at least 10 nm, at least 11-13 nm, at least 50 nm, at least 100 nm, at least 150 nm, at least 175 nm, at least 200 nm, at least 250 nm, at least 275 nm, at least 300 nm, at least 325 nm, at least 350 nm, or at least 360 nm. Alternatively, the radiation provided by radiation source SO has a wavelength of at most 450 nm, at most 425 nm, at most 375 nm, at most 360 nm, at most 325 nm, at most 275 nm, at most 250 nm, at most 225 nm, at most 200 nm, or at most 175 nm. The radiation can have a wavelength including 436 nm, 405 nm, 365 nm, 355 nm, 248 nm, 193 nm, 157 nm, and/or 126 nm.

The source and the lithographic apparatus can be separate entities, for example when the source is an excimer laser. In such cases, the source is not considered to form part of the lithographic apparatus and the radiation beam is passed from the source SO to the illuminator IL with the aid of a beam delivery system BD comprising, for example, suitable directing mirrors and/or a beam expander. In other cases the source can be an integral part of the lithographic apparatus, for example when the source is a mercury lamp. The source SO and the illuminator IL, together with the beam delivery system BD if required, can be referred to as a radiation system.

The illuminator IL, can comprise an adjuster AD for adjusting the angular intensity distribution of the radiation beam. Generally, at least the outer and/or inner radial extent (commonly referred to as σ-outer and σ-inner, respectively) of the intensity distribution in a pupil plane of the illuminator can be adjusted. In addition, the illuminator IL can comprise various other components, such as an integrator IN and a condenser CO. The illuminator can be used to condition the radiation beam to have a desired uniformity and intensity distribution in its cross-section. The illuminator IL, or an additional component associated with it, can also be arranged to divide the radiation beam into a plurality of sub-beams that can, for example, each be associated with one or a plurality of the individually controllable elements of the array of individually controllable elements. A two-dimensional diffraction grating can, for example, be used to divide the radiation beam into sub-beams. In the present description, the terms "beam of radiation" and "radiation beam" encompass, but are not limited to, the situation in which the beam is comprised of a plurality of such sub-beams of radiation.

The radiation beam B is incident on the patterning device PD (e.g., an array of individually controllable elements) and is modulated by the patterning device. Having been reflected by the patterning device PD, the radiation beam B passes through the projection system PS, which focuses the beam onto a target portion C of the substrate W. With the aid of the positioner PW and position sensor IF2 (e.g., an interferometric device, linear encoder, capacitive sensor, or the like), the substrate table WT can be moved accurately, e.g., so as to position different target portions C in the path of the radiation beam B. Where used, the positioning means for the array of individually controllable elements can be used to correct accurately the position of the patterning device PD with respect to the path of the beam B, e.g., during a scan.

In one example, movement of the substrate table WT is realized with the aid of a long-stroke module (course positioning) and a short-stroke module (fine positioning), which are not explicitly depicted in FIG. 1. In another example, a short stroke stage cannot be present. A similar system can also be used to position the array of individually controllable elements. It will be appreciated that the beam B can alternatively/additionally be moveable, while the object table and/or the array of individually controllable elements can have a fixed position to provide the required relative movement. Such an arrangement can assist in limiting the size of the apparatus. As a further alternative, which can, e.g., be applicable in the manufacture of flat panel displays, the position of the substrate table WT and the projection system PS can be fixed and the substrate W can be arranged to be moved relative to the substrate table WT. For example, the substrate table WT can be provided with a system for scanning the substrate W across it at a substantially constant velocity.

As shown in FIG. 1, the beam of radiation B can be directed to the patterning device PD by means of a beam splitter BS configured such that the radiation is initially reflected by the beam splitter and directed to the patterning device PD. It should be realized that the beam of radiation B can also be directed at the patterning device without the use of a beam splitter. The beam of radiation can be directed at the patterning device at an angle between 0 and 90°, between 5 and 85°, between 15 and 75°, between 25 and 65°, or between 35 and 55° (the embodiment shown in FIG. 1 is at a 90° angle). The patterning device PD modulates the beam of radiation B and reflects it back to the beam splitter BS which transmits the modulated beam to the projection system PS. It will be appreciated, however, that alternative arrangements can be used to direct the beam of radiation B to the patterning device PD and subsequently to the projection system PS. In particular, an arrangement such as is shown in FIG. 1 cannot be required if a transmission patterning device is used.

The depicted apparatus can be used in several modes:

1. In step mode, the array of individually controllable elements and the substrate are kept essentially stationary, while an entire pattern imparted to the radiation beam is projected onto a target portion C at one go (i.e., a single static exposure). The substrate table WT is then shifted in the X and/or Y direction so that a different target portion C can be exposed. In step mode, the maximum size of the exposure field limits the size of the target portion C imaged in a single static exposure.

2. In scan mode, the array of individually controllable elements and the substrate are scanned synchronously while a pattern imparted to the radiation beam is projected onto a target portion C (i.e., a single dynamic exposure). The velocity and direction of the substrate relative to the array of individually controllable elements can be determined by the (de-) magnification and image reversal characteristics of the projection system PS. In scan mode, the maximum size of the exposure field limits the width (in the non-scanning direction) of the target portion in a single dynamic exposure, whereas the length of the scanning motion determines the height (in the scanning direction) of the target portion.

3. In pulse mode, the array of individually controllable elements is kept essentially stationary and the entire pattern is projected onto a target portion C of the substrate W using a pulsed radiation source. The substrate table WT is moved with an essentially constant speed such that the beam B is caused to scan a line across the substrate W. The pattern on the array of individually controllable elements is updated as required between pulses of the radiation system and the pulses are timed such that successive target portions C are exposed at the required locations on the substrate W. Consequently, the beam B can scan across the substrate W to expose the complete pattern for a strip of the substrate. The process is repeated until the complete substrate W has been exposed line by line.

4. Continuous scan mode is essentially the same as pulse mode except that the substrate W is scanned relative to the modulated beam of radiation B at a substantially constant speed and the pattern on the array of individually controllable elements is updated as the beam B scans across the substrate W and exposes it. A substantially constant radiation source or a pulsed radiation source, synchronized to the updating of the pattern on the array of individually controllable elements, can be used.

5. In pixel grid imaging mode, which can be performed using the lithographic apparatus of FIG. 2, the pattern formed on substrate W is realized by subsequent exposure of spots formed by a spot generator that are directed onto patterning device PD. The exposed spots have substantially the same shape. On substrate W the spots are printed in substantially a grid. In one example, the spot size is larger than a pitch of a printed pixel grid, but much smaller than the exposure spot grid. By varying intensity of the spots printed, a pattern is realized. In between the exposure flashes the intensity distribution over the spots is varied.

Combinations and/or variations on the above described modes of use or entirely different modes of use can also be employed.

In lithography, a pattern is exposed on a layer of resist on the substrate. The resist is then developed. Subsequently, additional processing steps are performed on the substrate. The effect of these subsequent processing steps on each portion of the substrate depends on the exposure of the resist. In particular, the processes are tuned such that portions of the substrate that receive a radiation dose above a given dose threshold respond differently to portions of the substrate that receive a radiation dose below the dose threshold. For example, in an etching process, areas of the substrate that receive a radiation dose above the threshold are protected from etching by a layer of developed resist. However, in the post-exposure development, the portions of the resist that receive a radiation dose below the threshold are removed and therefore those areas are not protected from etching. Accordingly, a desired pattern can be etched. In particular, the individually controllable elements in the patterning device are set such that the radiation that is transmitted to an area on the substrate within a pattern feature is at a sufficiently high intensity that the area receives a dose of radiation above the dose threshold during the exposure. The remaining areas on the substrate receive a radiation dose below the dose threshold by setting the corresponding individually controllable elements to provide a zero or significantly lower radiation intensity.

In practice, the radiation dose at the edges of a pattern feature does not abruptly change from a given maximum dose to zero dose even if the individually controllable elements are set to provide the maximum radiation intensity on one side of the feature boundary and the minimum radiation intensity on the other side. Instead, due to diffractive effects, the level of the radiation dose drops off across a transition zone. The position of the boundary of the pattern feature ultimately formed by the developed resist is determined by the position at which the received dose drops below the radiation dose threshold. The profile of the drop-off of radiation dose across the transition zone, and hence the precise position of the pattern feature boundary, can be controlled more precisely by setting the individually controllable elements that provide radiation to points on the substrate that are on or near the pattern feature boundary. These can be not only to maximum or minimum intensity levels, but also to intensity levels between the maximum and minimum intensity levels. This is commonly referred to as "grayscaling."

Grayscaling provides greater control of the position of the pattern feature boundaries than is possible in a lithography system in which the radiation intensity provided to the substrate by a given individually controllable element can only be set to two values (e.g., just a maximum value and a minimum value). At least 3, at least 4 radiation intensity values, at least 8 radiation intensity values, at least 16 radiation intensity values, at least 32 radiation intensity values, at least 64 radiation intensity values, at least 128 radiation intensity values, or at least 256 different radiation intensity values can be projected onto the substrate.

It should be appreciated that grayscaling can be used for additional or alternative purposes to that described above. For example, the processing of the substrate after the exposure can be tuned, such that there are more than two potential responses of regions of the substrate, dependent on received radiation dose level. For example, a portion of the substrate receiving a radiation dose below a first threshold responds in a first manner; a portion of the substrate receiving a radiation dose above the first threshold but below a second threshold responds in a second manner; and a portion of the substrate receiving a radiation dose above the second threshold responds in a third manner. Accordingly, grayscaling can be used to provide a radiation dose profile across the substrate having more than two desired dose levels. The radiation dose profile can have at least 2 desired dose levels, at least 3 desired radiation dose levels, at least 4 desired radiation dose levels, at least 6 desired radiation dose levels or at least 8 desired radiation dose levels.

It should further be appreciated that the radiation dose profile can be controlled by methods other than by merely controlling the intensity of the radiation received at each point on the substrate, as described above. For example, the radiation dose received by each point on the substrate can alternatively or additionally be controlled by controlling the duration of the exposure of the point. As a further example, each point on the substrate can potentially receive radiation in a plurality of successive exposures. The radiation dose received by each point can, therefore, be alternatively or additionally controlled by exposing the point using a selected subset of the plurality of successive exposures.

FIG. 2 depicts an arrangement of the apparatus according to the present invention that can be used, e.g., in the manufacture of flat panel displays. Components corresponding to those shown in FIG. 1 are depicted with the same reference numerals. Also, the above descriptions of the various embodiments, e.g., the various configurations of the substrate, the contrast device, the MLA, the beam of radiation, etc., remain applicable.

As shown in FIG. 2, the projection system PS includes a beam expander, which comprises two lenses L1, L2. The first lens L1 is arranged to receive the modulated radiation beam B and focus it through an aperture in an aperture stop AS. A further lens AL can be located in the aperture. The radiation beam B then diverges and is focused by the second lens L2 (e.g., a field lens).

The projection system PS further comprises an array of lenses MLA arranged to receive the expanded modulated radiation B. Different portions of the modulated radiation beam B, corresponding to one or more of the individually controllable elements in the patterning device PD, pass through respective different lenses ML in the array of lenses MLA. Each lens focuses the respective portion of the modulated radiation beam B to a point which lies on the substrate W. In this way an array of radiation spots S is exposed onto the substrate W. It will be appreciated that, although only eight lenses of the illustrated array of lenses 14 are shown, the array of lenses can comprise many thousands of lenses (the same is true of the array of individually controllable elements used as the patterning device PD).

Figure 3:
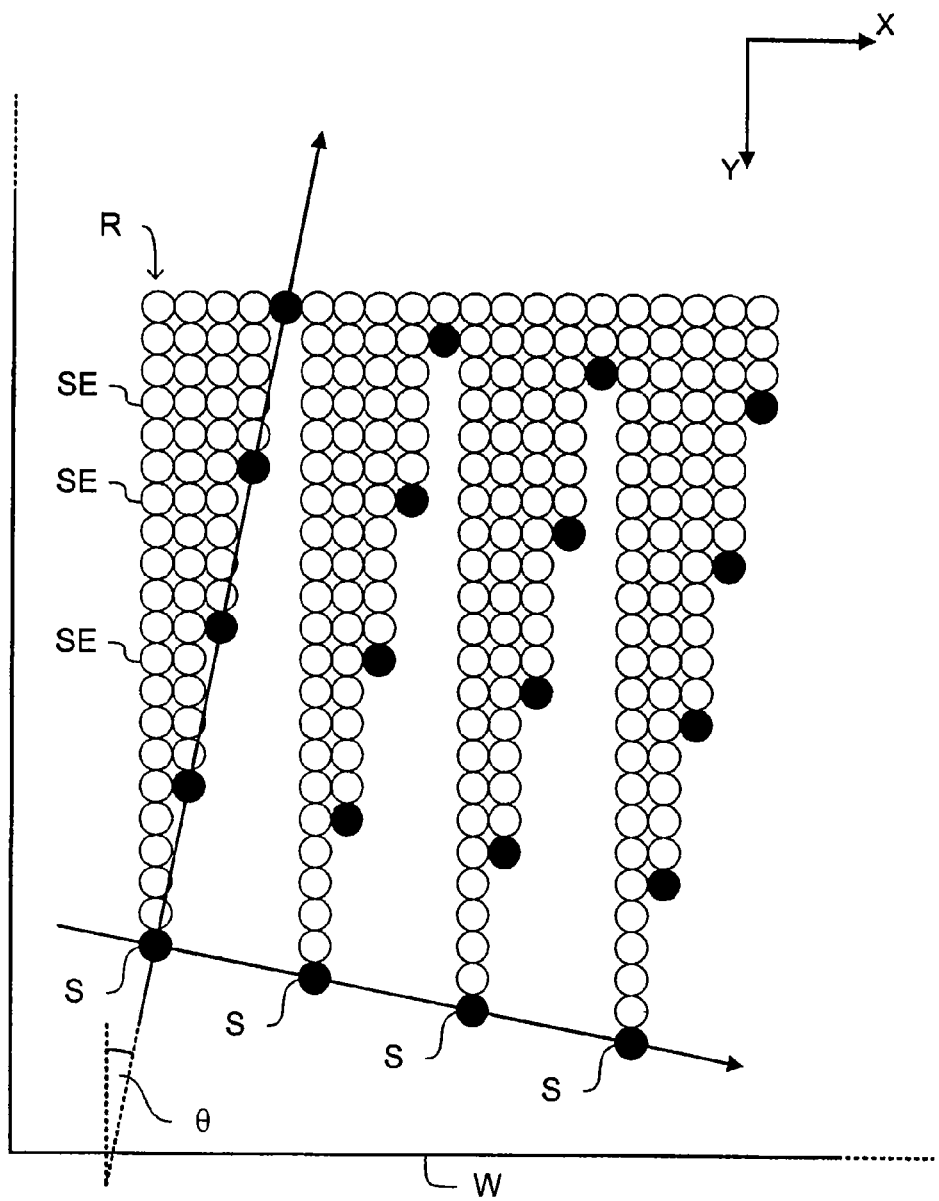
FIG. 3 depicts a mode of transferring a pattern to substrate.

FIG. 3 illustrates schematically how a pattern on a substrate W is generated using the system of FIG. 2, according to one embodiment of the present invention. The filled in circles represent the array of spots S projected onto the substrate W by the array of lenses MLA in the projection system PS. The substrate W is moved relative to the projection system PS in the Y direction as a series of exposures are exposed on the substrate W. The open circles represent spot exposures SE that have previously been exposed on the substrate W. As shown, each spot projected onto the substrate by the array of lenses within the projection system PS exposes a row R of spot exposures on the substrate W. The complete pattern for the substrate is generated by the sum of all the rows R of spot exposures SE exposed by each of the spots S. Such an arrangement is commonly referred to as "pixel grid imaging," discussed above.

It can be seen that the array of radiation spots S is arranged at an angle θ relative to the substrate W (the edges of the substrate lie parallel to the X and Y directions). This is done so that when the substrate is moved in the scanning direction (the Y-direction), each radiation spot will pass over a different area of the substrate, thereby allowing the entire substrate to be covered by the array of radiation spots 15. The angle θ can be at most 20°, at most 10°, at most 5°, at most 3°, at most 1°, at most 0.5°, at most 0.25°, at most 0.10°, at most 0.05°, or at most 0.01°. Alternatively, the angle θ is at least 0.001°.

Figure 4:
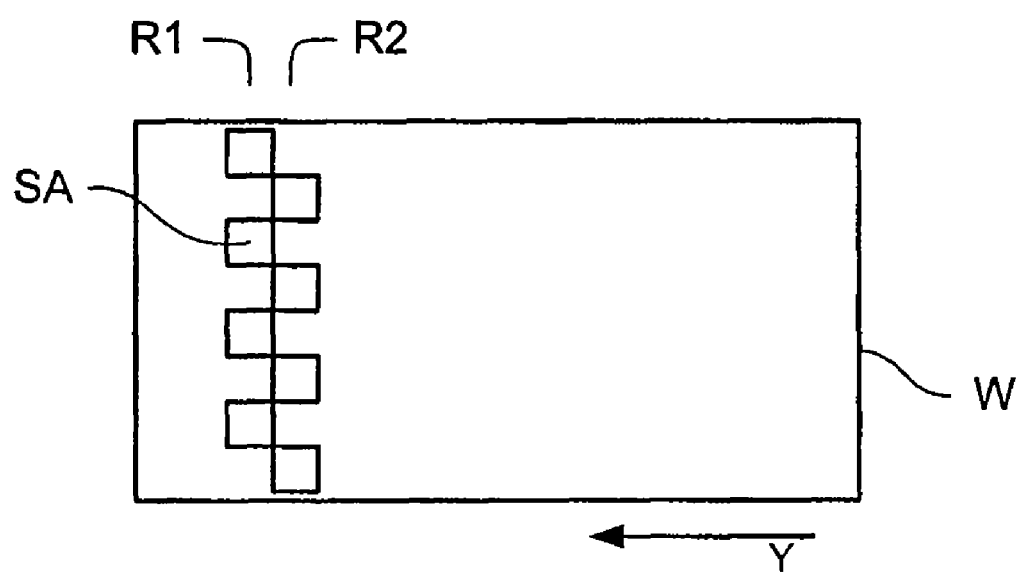
FIG. 4 depicts an arrangement of optical engines.

FIG. 4 shows schematically how an entire flat panel display substrate W can be exposed in a single scan using a plurality of optical engines, according to one embodiment of the present invention. In the example shown eight arrays SA of radiation spots S are produced by eight optical engines (not shown), arranged in two rows R1, R2 in a "chess board" configuration, such that the edge of one array of radiation spots (e.g., spots S in FIG. 3) slightly overlaps (in the scanning direction Y) with the edge of the adjacent array of radiation spots. In one example, the optical engines are arranged in at least 3 rows, for instance 4 rows or 5 rows. In this way, a band of radiation extends across the width of the substrate W, allowing exposure of the entire substrate to be performed in a single scan. It will be appreciated that any suitable number of optical engines can be used. In one example, the number of optical engines is at least 1, at least 2, at least 4, at least 8, at least 10, at least 12, at least 14, or at least 17. Alternatively, the number of optical engines is less than 40, less than 30 or less than 20.

Each optical engine can comprise a separate illumination system IL, patterning device PD and projection system PS as described above. It is to be appreciated, however, that two or more optical engines can share at least a part of one or more of the illumination system, patterning device and projection system.

FIG. 5 schematically depicts a conventional apparatus for increasing the duration of a radiation beam pulse in a lithographic apparatus. In FIG. 5, a radiation source SO emits a radiation beam pulse 1, which is incident upon a beam splitter 2. The beam splitter 2 is arranged to reflect a first portion of the radiation beam pulse 1a towards a first concave mirror 3 and to simultaneously transmit a second portion of the radiation beam pulse 1b without reflection.

In FIG. 5, the first portion of the radiation beam pulse is incident upon the first concave mirror 3. The first concave mirror 3 then reflects the first portion of the radiation beam pulse 1a towards a second concave mirror 4, which is located on a side of the beam splitter 2 opposite from the first concave mirror 3. The first portion of the radiation beam pulse 1a is incident upon the second concave mirror 4 and is subsequently reflected back towards a different part of the first concave mirror 3. The first portion of the radiation beam pulse 1a falls incident upon the different part of the first concave mirror 3 and is subsequently reflected back towards a different part of the second concave mirror 4. Once incident on the second concave mirror 4, the first portion of the radiation beam pulse 1a is reflected by the second concave mirror 4 back towards the beam splitter 2. At this point, the first portion of the radiation beam pulse 1a has completed one optical circuit around the conventional apparatus (e.g., the first portion of the radiation beam pulse 1a has traveled from the beam splitter 2, around the concave mirrors 3, 4 and back to the beam splitter 2).

Depending on the properties of the beam splitter 2, a number of potential outcomes may occur when the first portion of the radiation beam pulse 1a reaches the beam splitter 2. In one embodiment, the first portion of the radiation beam pulse 1a is reflected by the beam splitter 2 in the direction of the (transmitted) second portion of the radiation beam pulse 1b. Since the first portion of the radiation beam pulse 1a has traveled further than the second portion of the radiation beam pulse 1b (i.e., it has a longer path length), the first portion of the radiation beam pulse 1a will lag behind the second portion of the radiation beam pulse 1b. By arranging the concave mirrors 3 and 4 in a suitable manner, the first portion of the radiation beam pulse 1a and the second portion of the radiation beam pulse 1b may be combined to form a radiation beam pulse 5 that is longer in duration than either the first portion of the radiation beam pulse 1a or the second portion of the radiation beam portion 1b. The first portion of the radiation beam pulse 1a and the second portion of the radiation beam pulse 1b may overlap with one another in the combined radiation pulse 5. Alternatively, there may be no overlap between the first portion of the radiation beam pulse 1a and the second portion of the radiation beam pulse 1b in the combined radiation pulse 5.

In another embodiment, only a part of the first portion of the radiation beam pulse 1a is reflected in the direction of the second portion of the radiation beam pulse 1b after the completion of one optical circuit. An additional part of the first portion of the radiation beam pulse 1a may, after completing the optical circuit, be transmitted through the beam splitter 2 and undertake one or more optical circuits via the first concave mirror 3, second concave mirror 4 and beam splitter 2. The number of circuits undertaken by at least a part of the first portion of the radiation beam pulse 1a can be controlled by varying: (i) the separation of the first concave mirror 3 and second concave mirror 4; (ii) the extent to which the beam splitter 2 is transparent to the radiation beam pulse 1; and (iii) a time delay between the times at which the first portion of the radiation beam pulse 1a and the (not reflected, but initially transmitted) second portion of the radiation beam pulse 1b respectively combine. The variation of these parameters, which control the duration of the combined radiation beam pulse 5, may be accomplished through various principles that would be apparent to one skilled in the art, and that therefore, will not be described in further detail.

One approach to increasing the duration of the resultant combined radiation beam pulse 5 involves increasing the number of optical circuits undertaken by the first portion of the radiation beam pulse 1a. As described above, this parameter may be controlled by selecting the extent to which the beam splitter 2 is transmissive with respect to the radiation beam pulse 1. Increasing the number of optical circuits serves to increase the amount of the first portion of the radiation beam pulse 1a that is reflected in the direction of the (non-reflected) second portion of the radiation beam pulse 1b, and that combines with the second portion of the radiation beam pulse 1b to increase the pulse duration of the resultant combined radiation beam pulse 5. However, there are limits to which the duration of the combined radiation beam pulse can be increased using the conventional apparatus of FIG. 5.

The conventional apparatus of FIG. 5 incorporates a first concave mirror 3 and a second concave mirror 4. The first concave mirror 3 and second concave mirror 4 typically reflect between 98% and 98.5% of an incident radiation beam pulse. As depicted in FIG. 5, the first portion of the radiation beam pulse 1a is reflected four times for one optical circuit, twice by respective concave mirrors 3 and 4. Therefore, for each optical circuit, the intensity of the first portion of the radiation beam pulse 1a is reduced by at least 6% (four reflections multiplied by the best case scenario of a 1.5% loss of pulse intensity per reflection). As such, when the first radiation beam pulse 1a combines with the second radiation beam pulse 1b to form the combined radiation beam pulse 5, the intensity of the combined radiation beam pulse 5 is substantially lower than if the mirrors were 100% reflective. As the first portion of the radiation beam pulse 1a undertakes more circuits (for example, to increase the pulse duration of the combined radiation beam pulse 5), each pulse that combines with the second portion of the radiation beam pulse 1b to form the combined radiation beam pulse 5 experiences an increasing loss in intensity. For example, a radiation beam pulse 1 having a pulse duration of 80 nanoseconds can have its pulse length increased to 150 nanoseconds using the convention apparatus of FIG. 5, although the average intensity of the resultant combined beam 5 is 80% of the original radiation beam pulse 1 due to the losses in intensity at each respective concave mirror 3 and 4. Additional efforts to increase the pulse duration in such a fashion may reduce the intensity of the radiation beam pulse 1 below levels of practical utility. Therefore, it is desirable to provide a method and apparatus that allows the pulse duration of a radiation beam to be extended without such a loss in intensity as is inherent in prior art apparatuses and methods.

FIG. 6 depicts an exemplary apparatus for controlling electromagnetic radiation pulse in a lithographic apparatus. The apparatus comprises a beam splitter 10, a first prism 11, and a second prism 12. The first prism 11 is located on one side of the beam splitter 10, and the second prism 12 on another, opposite side of the beam splitter 10. A radiation source SO emits a radiation beam pulse 1 in the direction of the beam splitter 10.

The beam splitter 10 is oriented to reflect a first portion of the radiation beam pulse 1a toward the first prism 11. The first prism 11 is shaped and oriented to receive the first portion of the radiation beam pulse 1a and redirect the first portion of the radiation beam pulse 1a in the direction of the second prism 12. The second prism 12 is shaped and oriented to then receive and redirect the first portion of the radiation beam pulse 1a back towards the beam splitter 10. When the first portion of the radiation beam pulse 1a reaches the beam splitter 10, it has completed one optical circuit (e.g., the first portion of the radiation beam pulse 1a has traveled from the beam splitter 10, around the prisms 11, 12 and back to the beam splitter 10).

After completing an optical circuit, one or more portions of the first portion of the radiation beam pulse 1a may undertake one or more optical circuits around the apparatus, depending upon the transmissive nature of the beam splitter 10. At the end of each optical circuit, a portion of the first portion of the radiation beam pulse 1a is directed by the beam splitter 10 in the direction of the second portion of the radiation beam pulse 1b (i.e., along a common optical axis). The directed part of the first portion of the radiation beam pulse 1a lags and/or overlaps with and effectively combines with the second portion of the radiation beam pulse 1b which has been transmitted by the beam splitter 10. The combined radiation beam pulse 5 has a longer pulse duration than the radiation beam pulse 1 that was emitted from the radiation source SO.

In various embodiments, the prisms 11, 12 and beam splitter 10 may form part of the beam delivery apparatus BD or the illumination system IL, as described with reference to the exemplary lithographic apparatus of FIG. 1. Alternatively, the prisms 11, 12 and beam splitter 10 may be incorporated into the source SO. In addition, the electromagnetic radiation pulse control apparatus may be an independent apparatus located in or around the source SO, beam delivery apparatus BD, the illumination system IL or any other part of the lithographic apparatus.

The exemplary apparatus depicted in FIG. 6 may be desirable over conventional apparatus, such as the conventional apparatus depicted in FIG. 5. The exemplary apparatus takes advantage of two optical principles that reduce the losses in intensity per optical circuit of the portion of the radiation beam 1a reflected by the beam splitter 10. These principles include that of total internal reflection and the principles associated with Brewster's angle.

Figure 7:
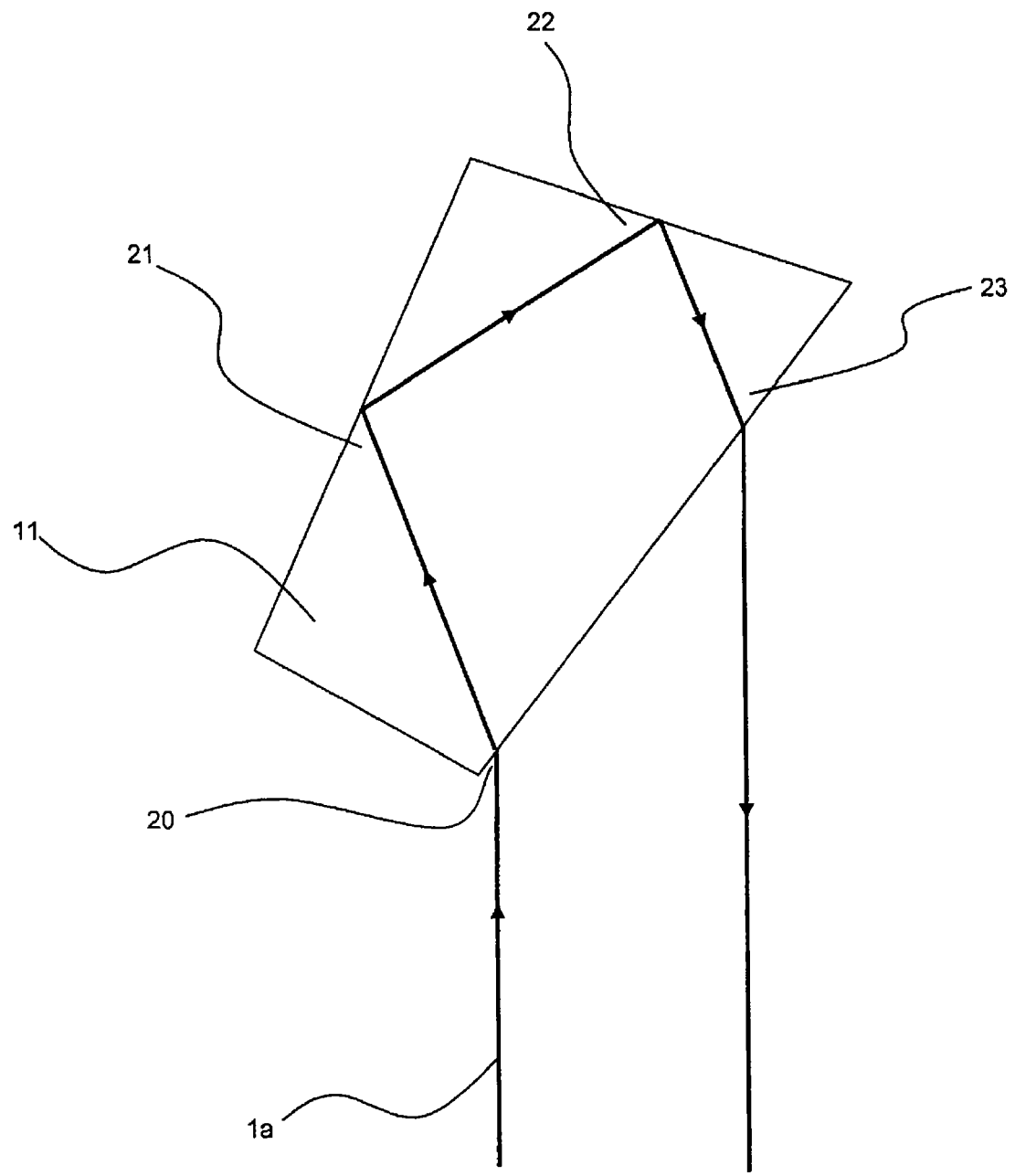
FIGS. 7 and 8 depict optical elements that may be incorporated into the exemplary apparatus of FIG. 6.
Figure 8:
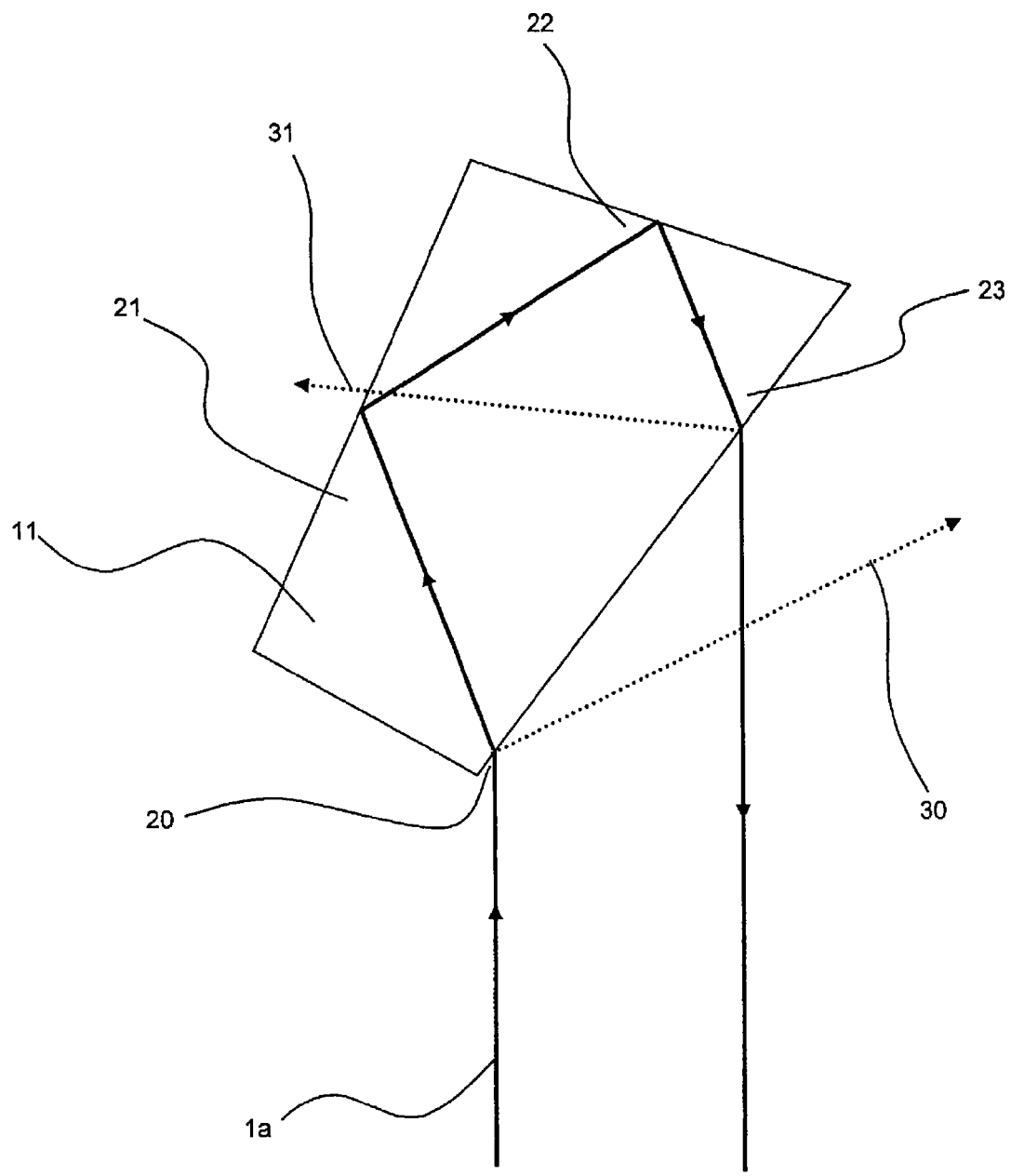

FIG. 7 depicts a first prism 11 that may be incorporated into the exemplary apparatus of FIG. 6. In FIG. 7, the (reflected) first portion of the radiation beam pulse 1a is incident upon the first prism 11 at a specific first angle 20. As seen in FIG. 8, the first prism 11 is shaped and oriented such that the first angle 20 is equal to Brewster's Angle. All p-polarized components of a radiation beam incident upon a body (e.g., a prism) at Brewster's Angle will be refracted into the body, and as such, no p-polarized components will be reflected and lost. Radiation beams used in lithography are often p-polarized, implying that the (reflected) first portion of the radiation beam 1a would also be p-polarized. Thus, the entire first portion of the radiation beam pulse 1a will be refracted into the first prism 11. Theoretically, therefore, there would be no loss in intensity of the first portion of the radiation beam 1a when it is incident upon and then is refracted into the first prism 11.

After refraction into the first prism 11, the first portion of the radiation beam pulse 1a internally reflects off two sides of the first prism 11. The first portion of the radiation beam pulse 1a is first incident upon a surface of the first prism 11 at a second specific angle 21. This second angle 21 is arranged to be equal to or higher than the critical angle of the first prism 11, thus providing for total internal reflection of the first portion of the radiation beam pulse 1a. In theory, total internal reflection is lossless, implying that there is no loss of intensity of the first portion of the radiation beam pulse 1a after it has been reflected. The first portion of the radiation beam pulse 1a then reflects off another surface of the first prism 11. The first portion of the radiation beam pulse 1a is incident upon this surface of the first prism 11 at a third specific angle 22. The third specific angle 22 may also be equal to or greater than the critical angle of the first prism 11 in order to ensure total internal reflection of the first portion of the radiation beam pulse 1a. Therefore, at least in theory, the reflection of the first portion of the radiation beam pulse 1a is lossless, implying that there is no loss of intensity of the first portion of the radiation beam pulse 1a. By making the third specific angle 22 and the fourth specific angle 23 equal to each other, the tolerance (e.g., safety margin) in the angle of the incidence of the first portion of the radiation beam 1a on the first prism 11 necessary to achieve total internal reflection off the two internal surfaces may be the same.

The first portion of the radiation beam pulse 1a is then incident upon an additional surface of the prism at a fourth specific angle 23. This fourth specific angle 23 is equal to Brewster's Angle for the first prism 11. This implies that all p-polarized components of the first portion of the radiation beam pulse 1a will be refracted into the medium surrounding the first prism 11 (e.g., air, or a low pressure environment approaching a vacuum). Substantially no components will be reflected or refracted into the body of the first prism 11, since the first portion of the radiation beam pulse 1a comprises only p-polarized components. Therefore, at least in theory, there is no loss in intensity of the first portion of the radiation pulse 1a as it emerges from the prism 11.

In FIG. 7, the location of the entrance of the first portion of the radiation beam pulse 1a into the first prism 11 is offset from the location of the exit of the first portion of the radiation beam pulse 1a from the first prism 11. This offset is introduced to ensure that, after emerging from the first prism 11, the first portion of the radiation beam pulse 1a is not incident upon the beam splitter 10 (as shown in FIG. 7), but instead is incident upon the second prism 12.

Therefore, at least in theory, there is no loss in intensity of the first portion of the radiation beam pulse 1a as it is incident upon the first prism 11, refracted (or reflected) within the first prism 11, and subsequently emerges from the first prism 11. The same principles are equally applicable to the first portion of the radiation beam pulse 1a as it is incident upon, refracts within, and emerges from the second prism 12, as shown in FIG. 6. Therefore, at least in theory, there is no loss of intensity of the first portion of the radiation beam pulse 1a as it undertakes one optical circuit. However, practical applications may experience some loss in intensity due to various factors, including the surface roughness of respective prisms 11 and 12. In such a case, the total loss in intensity may be as much as approximately 0.3% for each prism, and the first portion of the radiation beam pulse 1a may experience about a 0.6% loss in intensity over one optical circuit. Such losses are in stark contrast to the losses experienced within conventional apparatus, such as those described in FIG. 5, in which the radiation beam pulse loses 6% of its intensity over an optical circuit. Therefore, embodiments of the present invention may extend the duration of the combined radiation beam pulse while reducing the amount of intensity lost when compared with conventional apparatus.

FIG. 8 also depicts a first prism 11 that may be incorporated into the exemplary apparatus of FIG. 6. FIG. 8 is, in general, similar to FIG. 7, and components corresponding to those shown in FIG. 7 are depicted with the same reference numerals. Also, the above descriptions of the various embodiments, e.g., the first prism 11 and the specific angles of incidence, refraction, reflection, etc., of the first portion of the radiation beam pulse 1a remain applicable. However, in contrast to the embodiment of FIG. 7, the first portion of the radiation beam pulse 1a is not p-polarized, but is un-polarized. In FIG. 8, when the first portion of the radiation beam 1a is incident upon the first prism 11 at Brewster's angle 20, a part 30 of the first portion of the radiation beam pulse 1a is not refracted into the first prism 11, but instead reflects off the first prism. This is because the first portion of the radiation beam pulse 1a is un-polarized and some portion of its s-polarized components will be reflected. Similarly, when the first portion of the radiation beam 1a emerges from the first prism 11 at Brewster's angle 23, a part 31 of the first portion of the radiation beam pulse 1a is not refracted into medium surrounding the first prism 11, but instead reflects off the interface between the first prism 11 and the surrounding medium. This is because the first portion of the radiation beam pulse 1a is un-polarized, and some of its s-polarized components will be reflected. Therefore, in order to minimize the loss in intensity of the first portion of the radiation beam pulse 1a, the first portion of the radiation beam pulse 1a (and/or the radiation beam pulse from which the first portion is obtained) may be p-polarized.

The exemplary apparatus depicted in FIG. 6 features two prisms. However, it will be appreciated that other arrangements may be used, for example replacing a single mirror (e.g., any directing or redirecting element that can redirect a beam of radiation) in a conventional apparatus with a single prism. Although such an arrangement (i.e., an apparatus featuring both mirrors and prisms) may not be as efficient in reducing intensity loss as an apparatus comprising only prisms, a reduction in the loss of intensity of the conventional apparatus may nevertheless be obtained. It will also be appreciated that more than two prisms may be incorporated into the apparatus. For example, two prisms could take the place of a single prism, and the offset described above maybe introduced by separating the two prisms to a desired extent. In various embodiments, the two prisms could be 90° prisms or 90° Brewster prisms, or any additional prism that would be apparent to one skilled in the relevant arts.

FIG. 9 depicts an exemplary apparatus for controlling electromagnetic radiation pulse duration in a lithographic apparatus. In FIG. 9, the apparatus comprises a mirror block 100 and a first prism 110. A radiation source SO emits radiation beam pulse 1000 in the direction of the mirror block 100 and along a first optical axis 2000.

A first surface of the mirror block 100a is oriented to reflect a first portion of the radiation beam pulse 1000a toward the first prism 110. The first prism 110 is shaped and oriented to receive the first portion of the radiation beam pulse 1000a and redirect it in the direction of a second surface of the mirror block 100b. Further, the first prism 110 is shaped and oriented such that the first portion of the radiation beam pulse 1000a enters and leaves the first prism 110 at Brewster's angle, and as such, the first portion of the radiation beam pulse 1000a totally internally reflects around the first prism 110. The second surface of the mirror block 100b is oriented to reflect the first portion of the radiation beam pulse 1000a parallel to the first optical axis 2000 and away from the radiation source SO.

As the first portion of the radiation beam pulse is directed toward the first prism 110, a second portion of the radiation beam pulse 1000b simultaneously passes the mirror block 1000 and is not reflected. By the time the first portion of the radiation beam pulse 1000a has been refracted around the first prism 110, and has been reflected off the second surface of the prism 110b, the second portion of the radiation beam pulse 1000b has already passed or overtaken the first portion of the radiation beam pulse 1000a. Therefore, the first portion of the radiation beam pulse 1000a has a longer path length. By the time the first portion of the radiation beam pulse 1000a and the second portion of the radiation beam pulse 1000b are traveling parallel to one another and in the same direction along the first optical axis 2000, the first portion of the radiation beam pulse 1000a lags behind the second portion of the radiation beam pulse 1000b. Thus, a combined pulse 1500 has been created that is incorporates the first portion of the radiation beam pulse 1000a and the second portion of the radiation beam pulse 1000b, and the total duration of the combined pulse 1500 is longer than the duration of either the first portion of the radiation beam pulse 1000a or the second portion of the radiation beam pulse 1000b.

The prisms 110 and mirror block 100 may form part of, for example, the beam delivery apparatus BD or the illumination system IL described above with reference to in FIG. 1, or the prisms 110 and mirror block 100 may be part of the source SO. Alternatively, the electromagnetic radiation pulse control apparatus may be an independent apparatus located in or around the radiation source SO, beam delivery apparatus BD, the illumination system IL or any other part of the lithographic apparatus.

FIG. 9 is but one of a number of exemplary of electromagnetic radiation pulse control apparatuses that may utilize optical elements, including one or more prisms, to increase the pulse duration of a radiation beam pulse. As the apparatus of FIG. 9 incorporates prisms, the apparatus may take advantage of the principles of total internal reflection and the principles associated with Brewster's angle. Generally, a radiation beam pulse will be divided into at least two portions by a dividing element (e.g., a beam splitter, mirror, mirror block, etc.). The optical path length of one of the portions will be increased by directing it towards and refracting it around a prism. Both portions will then be directed in a common direction (i.e., parallel to a common optical axis) by a directing element (e.g., a mirror, prism, lens, beam splitter, etc) to result in a combined radiation beam pulse (or pulse train) having an longer duration than that of either of the two portions.

FIG. 10 depicts an additional exemplary apparatus for controlling electromagnetic radiation pulse duration in a lithographic apparatus. FIG. 10 is, in general, similar to the example shown in FIG. 9, and components corresponding to those shown in FIG. 9 are depicted with the same reference numerals. However, the mirror block 100 of FIG. 9 has been replaced by two prisms 200, 210 in FIG. 10. The prisms 200, 210 are shaped and oriented such that the first portion of the radiation beam pulse 1000a enters and leaves each prism 200, 210 at Brewster's angle, and such that it totally internally reflects within each prism 200, 210, thereby minimizing any losses in intensity (for example, in comparison with the use of the mirror block 100 in FIG. 9).

FIG. 11 depicts yet another exemplary apparatus for controlling electromagnetic radiation pulse duration in a lithographic apparatus. FIG. 11 is, in general, similar to the example shown in FIG. 10, and components corresponding to those shown in FIG. 10 are depicted with the same reference numerals. However, the first prism 110 of FIG. 10 has, in FIG. 11, been replaced by two prisms 300, 310. The prisms 300, 310 are shaped and oriented such that the first portion of the radiation beam pulse 1000a enters and leaves each prism 300, 310 at Brewster's angle, and such that it totally internally reflects within the each prism 300, 310, thereby minimizing any losses in intensity. It may be easier to design and construct two separate prisms 300, 310 to receive and re-direct a portion of the radiation beam in a specific direction than it would be to design and make a single prism (e.g., the first prism 110 of FIG. 10) to receive and re-direct a portion of the radiation beam in a specific direction.

It will be appreciated that the exact values of the shape, dimensions, and orientation of the prisms described above have not been given, nor have the exact values of the angles of incidence and refraction, etc., of the first portion of the radiation beam pulse as its incident upon, refracted around and emerges from the prisms. These variables may be readily calculated by one of ordinary skill in the art. The shapes and orientations of the prisms described above do not have to be as illustrated in the Figures. Various different shapes of prism, orientations of those prisms and angles of incidence, refraction, etc, may be practiced, as will be appreciated by one of ordinary skill in the art.

Additionally, or alternatively, a prism should not be held secure at a location where a beam of radiation is to internally reflect or refract in the prism, or enter or exit the prism. This is because an apparatus that holds the prism (e.g., a clamp) may affect properties of the radiation beam. For example, radiation may escape from an internally reflecting surface of a body when another surface/body gets close to the internally reflecting surface. If a radiation beam is intended to internally reflect at a specific location in the prism, the radiation beam may not completely internally reflect if a clamp were also present at that location. This may be because, amongst other things, the index of refraction of the material surrounding the prism at that location has changed.

The electromagnetic radiation pulse control apparatus has been described in relation to lithographic apparatuses. The lithographic apparatuses may be an optical lithographic apparatus, or, where appropriate, an imprint lithographic apparatus. The electromagnetic radiation pulse control apparatus does not need to be a part of, or used in conjunction with, a lithographic apparatus. The electromagnetic radiation pulse control apparatus may be used in any situation where it is desired to increase the duration of a pulse or pulses of a radiation beam.

Although specific reference is made above to the use of embodiments of the invention in the context of optical lithography, it will be appreciated that the invention can be used in other applications, for example imprint lithography, where the context allows, and is not limited to optical lithography. In imprint lithography a topography in a patterning device defines the pattern created on a substrate. The topography of the patterning device can be pressed into a layer of resist supplied to the substrate whereupon the resist is cured by applying electromagnetic radiation, heat, pressure or a combination thereof. The patterning device is moved out of the resist leaving a pattern in it after the resist is cured.

Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

It is to be appreciated that the Detailed Description section, and not the Summary and Abstract sections, is intended to be used to interpret the claims. The Summary and Abstract sections can set forth one or more, but not all exemplary embodiments of the present invention as contemplated by the inventor(s), and thus, are not intended to limit the present invention and the appended claims in any way.

What is claimed is:

1. An electromagnetic radiation pulse duration control apparatus comprising:
    a dividing element arranged to divide an electromagnetic radiation pulse into a first portion and a second portion;
    a prism arranged to receive, reflect, and emit the first portion of the electromagnetic radiation pulse, the prism being shaped or oriented such that the first portion of the electromagnetic radiation pulse is arranged to be incident upon the prism at substantially Brewster's angle; and
    at least one directing element arranged to direct the first portion of the electromagnetic radiation pulse, after being received from the prism, parallel to the second portion of the electromagnetic radiation pulse and parallel to a common optical axis.

2. The apparatus of claim 1, wherein the prism is shaped or oriented, such that the first portion of the electromagnetic radiation pulse is arranged to be substantially totally internally reflected by at least one surface of the prism.

3. The apparatus of claim 1, wherein the prism is shaped or oriented, such that at a location at which the first portion of the electromagnetic radiation pulse leaves the prism, the first portion of the electromagnetic radiation pulse is arranged to be incident upon a surface of the prism at substantially Brewster's angle.

4. The apparatus of claim 1, wherein the prism is shaped or oriented, such that the first portion of the electromagnetic radiation pulse is arranged to leave the prism at a location spaced apart from a location at which the first portion of the electromagnetic radiation pulse is arranged to enter the prism.

5. The apparatus of claim 1, wherein the dividing element comprises a beam splitter, a semi-transparent mirror, a mirror, or a mirror block.

6. The apparatus of claim 1, wherein the directing element comprises a beam splitter, a semi-transparent mirror, a mirror, or a mirror block.

7. The apparatus of claim 1, wherein the dividing element is arranged to:
    (i) reflect the first portion of the electromagnetic radiation pulse and reflect the second portion of the electromagnetic radiation pulse;
    (ii) reflect the first portion of the electromagnetic radiation pulse and transmit the second portion of the electromagnetic radiation pulse; or
    (iii) transmit the first portion of the electromagnetic radiation pulse and reflect the second portion of the electromagnetic radiation pulse.

8. The apparatus of claim 1, wherein the directing element is arranged to:
    (i) reflect the first portion of the electromagnetic radiation pulse and reflect the second portion of the electromagnetic radiation pulse;
    (ii) reflect the first portion of the electromagnetic radiation pulse and transmit the second portion of the electromagnetic radiation pulse; or
    (iii) transmit the first portion of the electromagnetic radiation pulse, and reflect the second portion of the electromagnetic radiation pulse.

9. The apparatus of claim 1, wherein the directing element is arranged to direct the first and second portions of the electromagnetic radiation pulse along the common optical axis.

10. The apparatus of claim 1, wherein the electromagnetic radiation pulse is arranged to be p-polarized.

11. The apparatus of claim 1, wherein the first portion of the electromagnetic radiation pulse is arranged to be p-polarized.

12. The apparatus of claim 1, wherein the apparatus is part of a lithographic apparatus.

13. The apparatus of claim 1, wherein the apparatus is part of a radiation source.

14. The apparatus of claim 13, wherein the radiation source is laser.

15. A method of controlling a duration of an electromagnetic radiation pulse, the method comprising:
    dividing the electromagnetic radiation pulse into a first portion and a second portion;
    using a prism to receive, reflect and then emit the first portion of the electromagnetic radiation pulse, the prism being shaped or oriented such that the first portion of the electromagnetic radiation pulse is arranged to be incident upon the prism at substantially Brewster's angle; and
    directing the first portion of the electromagnetic radiation pulse, after the using, and the second portion of the electromagnetic radiation pulse parallel to a common optical axis.

16. A lithographic apparatus comprising:
    an electromagnetic radiation pulse duration control apparatus comprising
        a dividing element arranged to divide an electromagnetic radiation pulse into a first portion and a second portion;
        a prism arranged to receive, reflect, and emit the first portion of the electromagnetic radiation pulse; and
        at least one directing element arranged to direct the first portion of the electromagnetic radiation pulse, after being received from the prism, parallel to the second portion of the electromagnetic radiation pulse and parallel to a common optical axis, wherein the pulse is directed toward an element of the lithographic apparatus.

17. The lithographic apparatus of claim 16, wherein the prism is shaped or oriented, such that the first portion of the electromagnetic radiation pulse is arranged to be incident upon the prism at substantially Brewster's angle.

* * * * *